(12) United States Patent
Manta et al.

(10) Patent No.: US 12,253,116 B1
(45) Date of Patent: Mar. 18, 2025

(54) HYDRAULIC PISTON DESIGN

(71) Applicant: Allison Transmission, Inc., Indianapolis, IN (US)

(72) Inventors: Ionut Manta, Avon, IN (US); Evan Meredith, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 18/453,441

(22) Filed: Aug. 22, 2023

(51) Int. Cl.
  *F16D 25/0638* (2006.01)
  *F16D 48/02* (2006.01)

(52) U.S. Cl.
  CPC .......... *F16D 25/0638* (2013.01); *F16D 25/14* (2013.01)

(58) Field of Classification Search
  CPC .............................. F16D 25/0638; F16D 25/14
  See application file for complete search history.

(56) References Cited

U.S. PATENT DOCUMENTS

| | | | |
|---|---|---|---|
| 3,282,385 A * | 11/1966 | Snyder | F16D 25/14 192/48.601 |
| 3,655,208 A | 4/1972 | Walker | |
| 3,815,716 A * | 6/1974 | Harrington | F16D 25/0638 192/70.252 |
| 4,548,306 A * | 10/1985 | Hartz | F16D 25/0638 188/72.3 |
| 4,909,371 A | 3/1990 | Okamoto et al. | |
| 5,611,746 A * | 3/1997 | Shaffer | F16H 48/08 475/89 |
| 6,098,771 A * | 8/2000 | Vu | F16D 25/0638 192/85.63 |
| 8,156,856 B2 | 4/2012 | Abe | |
| 8,613,682 B2 | 12/2013 | Beckner et al. | |
| 10,203,005 B2 | 2/2019 | Wilton et al. | |
| 10,895,289 B2 | 1/2021 | Tysman et al. | |
| 11,098,769 B2 * | 8/2021 | Yamaguchi | F16D 25/0638 |
| 11,255,386 B2 | 2/2022 | Kluck et al. | |

(Continued)

FOREIGN PATENT DOCUMENTS

| | | | |
|---|---|---|---|
| EP | 3071853 B2 | 12/2020 | |
| KR | 19980031320 A * | 7/1998 | F16D 13/38 |

(Continued)

OTHER PUBLICATIONS

PCT, Int. App. No. PCT/US2024/041927 Written Opinion, 6 pages, Nov. 27, 2024.

(Continued)

*Primary Examiner* — James J Taylor, II
(74) *Attorney, Agent, or Firm* — Woodard, Emhardt, Henry, Reeves & Wagner, LLP

(57) ABSTRACT

A system has been developed for engaging a clutch pack using a hydraulic piston. The system can be used with an automatic transmission or another part of the drivetrain of a vehicle. The system includes a piston, a clutch pack, and a housing that contains the piston and clutch pack. To engage and disengage the piston against the clutch pack, the system is configured to fill and empty a hydraulic chamber on a hydraulic side of the piston such that the hydraulic fluid moves the piston towards and away from the clutch pack. The piston includes one or more pads or standoffs that form flow gaps. The piston is further configured to position seals on the piston closer to the hydraulic side.

14 Claims, 7 Drawing Sheets

(56) References Cited

U.S. PATENT DOCUMENTS

| | | | |
|---|---|---|---|
| 11,608,864 B2 | 3/2023 | Gelmini et al. | |
| 2015/0136560 A1* | 5/2015 | Deo | F16D 25/12 192/85.17 |

FOREIGN PATENT DOCUMENTS

| | | | |
|---|---|---|---|
| KR | 101430875 B1 * | 5/2013 | F16D 25/0638 |
| WO | 1988009889 A1 | 3/1998 | |

OTHER PUBLICATIONS

PCT, Intl, App. No. PCT/US2024/041927 International Search Report, 3 pages, Nov. 27, 2024.

* cited by examiner

HYDRAULIC PISTON DESIGN

BACKGROUND

Hydraulic pistons are used in a wide variety of applications. For instance, hydraulic pistons are commonly used to actuate clutch plates in transmissions of vehicles. The hydraulic pistons in transmissions need to engage and disengage from the clutch plates in a consistent and timely manner. Failure to do so may lead to poor performance or even damage.

Thus, there is a need for improvement in this field.

SUMMARY

A unique hydraulic piston design has been developed to actuate clutch plates in a quick and consistent manner as well as address other issues. During transitions between engaged and disengaged states of the clutch plates in a clutch pack, it has been discovered that some piston designs perform inconsistently and/or slowly. For instance, a newer or intermediate piston design was developed in order to simplify the seal of the piston. During the development, it was found that this intermediate piston design would engage and disengage with the clutch plate pack too slowly and/or in an unreliable manner as compared to the older design. The inconsistent and slow performance of the piston can impact the quality of the vehicle performance such as causing poor shift performance between gears and/or poor clutch performance in general.

After analyzing the performance between the older and intermediate piston designs, it was unexpectedly discovered that the exhaust performance of the hydraulic fluid, such as oil, in the newer intermediate design was poorer than the older design. To actuate or stroke the piston so as to engage the clutch plates of the clutch pack, pressurized hydraulic fluid is supplied to the piston in a bore of a transmission (or other device) via one or more hydraulic fluid passages. Typically, but not always, the piston is biased by one or more return springs to disengage from the clutch pack. The pressurized hydraulic fluid needs to overcome this spring force so as to press and clamp the piston against the clutch pack when in this engaged or applied position. To disengage the piston from the clutch pack, the hydraulic fluid is exhausted through the same hydraulic fluid passages that supplied the hydraulic fluid, and the return spring pushes the piston back in the piston bore to the disengaged state or position (i.e., installed position). While reviewing the intermediate piston design, it was discovered that the piston presented a generally flat surface or area against the openings of the hydraulic fluid passages. In essence, the piston mainly covered the openings so as to constrict the flow of the hydraulic fluid when introduced and exhausted in the bore. In other words, it was discovered that the effective area or volume of the bore was reduced by the intermediate piston design.

A housing or drum of a clutch assembly in the transmission defines a bore in which the piston is slidably disposed. In one form, the piston is ring-shaped, and the bore is similarly ring-shaped. To enhance hydraulic fluid flow within the piston bore, the piston includes one or more pads or standoffs that form one or more flow gaps along a head of the piston. The pads space the piston head away from an enclosed end of the bore where the openings of the hydraulic fluid passages supply the hydraulic fluid to the bore. During retraction of the piston, the hydraulic fluid is able to flow in the flow gaps between the pads. When the piston is in the disengaged or installed position, any hydraulic fluid in the bore is at a relatively low pressure as compared to when the piston is in the engaged or applied position. The return springs press the pads of the piston against the surface of the enclosed end of the piston bore when the piston is disengaged from the clutch pack. The flow gaps between the pads allow the hydraulic fluid to flow freely back into the hydraulic fluid passages. In one form, the pads are positioned to generally prevent obstruction of the openings of the hydraulic fluid passages. The pads are generally aligned with the walls of the corresponding wall of the hydraulic fluid passage. With the pads positioned in such a manner, the hydraulic fluid is able to flow in and out of the piston bore in an unobstructed manner so as to facilitate generally laminar flow of the hydraulic fluid. In one version, the pads and corresponding flow gaps are located on a radially inward side of the piston head. As should be recognized, this configuration of the piston promotes the free flow of hydraulic fluid which in turn facilitates quick and consistent actuation of the clutch pack regardless of the temperature or other environmental conditions.

The piston further includes inner and outer seal rings or gaskets that slidably seal against the walls of the bore. The seals are designed to reduce hydraulic leakage around the piston when the hydraulic fluid is pressurized. The piston is configured so that the seal rings are recessed as far as possible within the piston bore as well as to reduce the weight of the piston. To reduce weight, the piston head defines a channel between the seal grooves. The base surface of the channel is generally planar with the interior surfaces of the seals. As viewed in another way, the head of the piston in essence is raised away from the base of the channel so as to provide enough material for structurally supporting the seals. Recessing the seals of the piston reduces the volume of hydraulic fluid required to actuate the piston, which in turn can enhance piston responsiveness and reliability.

The system and techniques as described and illustrated herein concern a number of unique and inventive aspects. Some, but by no means all, of these unique aspects are summarized below.

Aspect 1 generally concerns a system.

Aspect 2 generally concerns the system of any previous aspect including a transmission.

Aspect 3 generally concerns the system of any previous aspect including a clutch assembly.

Aspect 4 generally concerns the system of any previous aspect in which the transmission includes the clutch assembly.

Aspect 5 generally concerns the system of any previous aspect in which the clutch assembly has a clutch side and a hydraulic side located opposite to the clutch side.

Aspect 6 generally concerns the system of any previous aspect including a housing.

Aspect 7 generally concerns the system of any previous aspect in which the housing defines a bore.

Aspect 8 generally concerns the system of any previous aspect in which the housing defines a flow passage into the bore.

Aspect 9 generally concerns the system of any previous aspect in which the flow passage is configured to transport hydraulic fluid.

Aspect 10 generally concerns the system of any previous aspect in which the flow passage has an opening into the bore.

Aspect 11 generally concerns the system of any previous aspect in which the flow passage has a passage wall.

Aspect 12 generally concerns the system of any previous aspect in which the housing includes a clutch drum.

Aspect 13 generally concerns the system of any previous aspect including a clutch pack.

Aspect 14 generally concerns the system of any previous aspect in which the clutch pack includes one or more reaction plates and one or more friction plates.

Aspect 15 generally concerns the system of any previous aspect including a piston.

Aspect 16 generally concerns the system of any previous aspect in which the piston is slidably disposed in the bore.

Aspect 17 generally concerns the system of any previous aspect in which the piston is configured to actuate the clutch pack.

Aspect 18 generally concerns the system of any previous aspect in which the piston has an engaged position where the piston engages the clutch pack.

Aspect 19 generally concerns the system of any previous aspect in which the piston has a disengaged position where the piston is disengaged from the clutch pack.

Aspect 20 generally concerns the system of any previous aspect including a spring.

Aspect 21 generally concerns the system of any previous aspect in which the spring contacts the piston.

Aspect 22 generally concerns the system of any previous aspect in which the spring is configured to bias the piston to the disengaged position.

Aspect 23 generally concerns the system of any previous aspect in which the spring is configured to bias the piston towards the hydraulic side.

Aspect 24 generally concerns the system of any previous aspect in which the clutch pack is positioned on the clutch side.

Aspect 25 generally concerns the system of any previous aspect in which the flow passage is disposed on the hydraulic side.

Aspect 26 generally concerns the system of any previous aspect in which the piston defines a hydraulic chamber in the bore.

Aspect 27 generally concerns the system of any previous aspect in which the hydraulic chamber is positioned on the hydraulic side.

Aspect 28 generally concerns the system of any previous aspect in which the piston has a head.

Aspect 29 generally concerns the system of any previous aspect in which the piston has an engagement member extending opposite to the head.

Aspect 30 generally concerns the system of any previous aspect in which the engagement member is configured to engage the clutch pack.

Aspect 31 generally concerns the system of any previous aspect in which the engagement member is disposed on the clutch side.

Aspect 32 generally concerns the system of any previous aspect in which the head is disposed on the hydraulic side.

Aspect 33 generally concerns the system of any previous aspect in which the head includes an inner head and an outer head.

Aspect 34 generally concerns the system of any previous aspect in which the inner head is disposed radially inwards relative to the outer head.

Aspect 35 generally concerns the system of any previous aspect in which the head defines a groove configured to receive a seal to seal against the bore.

Aspect 36 generally concerns the system of any previous aspect in which the head is configured to recess the seal towards the hydraulic side.

Aspect 37 generally concerns the system of any previous aspect in which the seal includes a gasket.

Aspect 38 generally concerns the system of any previous aspect in which the inner head defines an inner groove.

Aspect 39 generally concerns the system of any previous aspect including an inner gasket received in the inner groove.

Aspect 40 generally concerns the system of any previous aspect in which the inner gasket is configured to seal against the bore.

Aspect 41 generally concerns the system of any previous aspect in which the outer head defines an outer groove.

Aspect 42 generally concerns the system of any previous aspect including an outer gasket received in the outer groove.

Aspect 43 generally concerns the system of any previous aspect in which the outer gasket is configured to seal against the bore.

Aspect 44 generally concerns the system of any previous aspect in which the head of the piston is configured to recess the inner gasket and the outer gasket further into the bore.

Aspect 45 generally concerns the system of any previous aspect in which the head defines a channel.

Aspect 46 generally concerns the system of any previous aspect in which the channel is defined between the inner head and the outer head.

Aspect 47 generally concerns the system of any previous aspect in which the head of the piston is configured to reduce flow restrictions of the hydraulic fluid from the flow passage.

Aspect 48 generally concerns the system of any previous aspect in which the piston is configured to engage and disengage with the clutch pack in a quick manner.

Aspect 49 generally concerns the system of any previous aspect in which the piston is configured to engage and disengage with the clutch pack in a consistent manner.

Aspect 50 generally concerns the system of any previous aspect in which the head has one or more pads extending from the head.

Aspect 51 generally concerns the system of any previous aspect in which the pads define one or more gaps where the hydraulic fluid flows.

Aspect 52 generally concerns the system of any previous aspect in which the pads are positioned on the inner head.

Aspect 53 generally concerns the system of any previous aspect in which the pads are aligned with the passage wall of the flow passage to reduce flow constriction of the hydraulic fluid.

Aspect 54 generally concerns the system of any previous aspect in which the bore has a bore head wall.

Aspect 55 generally concerns the system of any previous aspect in which the pads are configured to contact the bore head wall when in the disengaged position.

Aspect 56 generally concerns the system of any previous aspect in which the engagement member has an inner ridge and an outer ridge.

Aspect 57 generally concerns the system of any previous aspect in which the engagement member defines a cavity between the inner ridge and the outer ridge.

Aspect 58 generally concerns the system of any previous aspect in which the inner ridge is located radially inwards relative to the outer ridge.

Aspect 59 generally concerns the system of any previous aspect in which the channel has a floor.

Aspect 60 generally concerns the system of any previous aspect in which the inner gasket and the outer gasket have surfaces aligned with floor of the channel in a planar manner.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
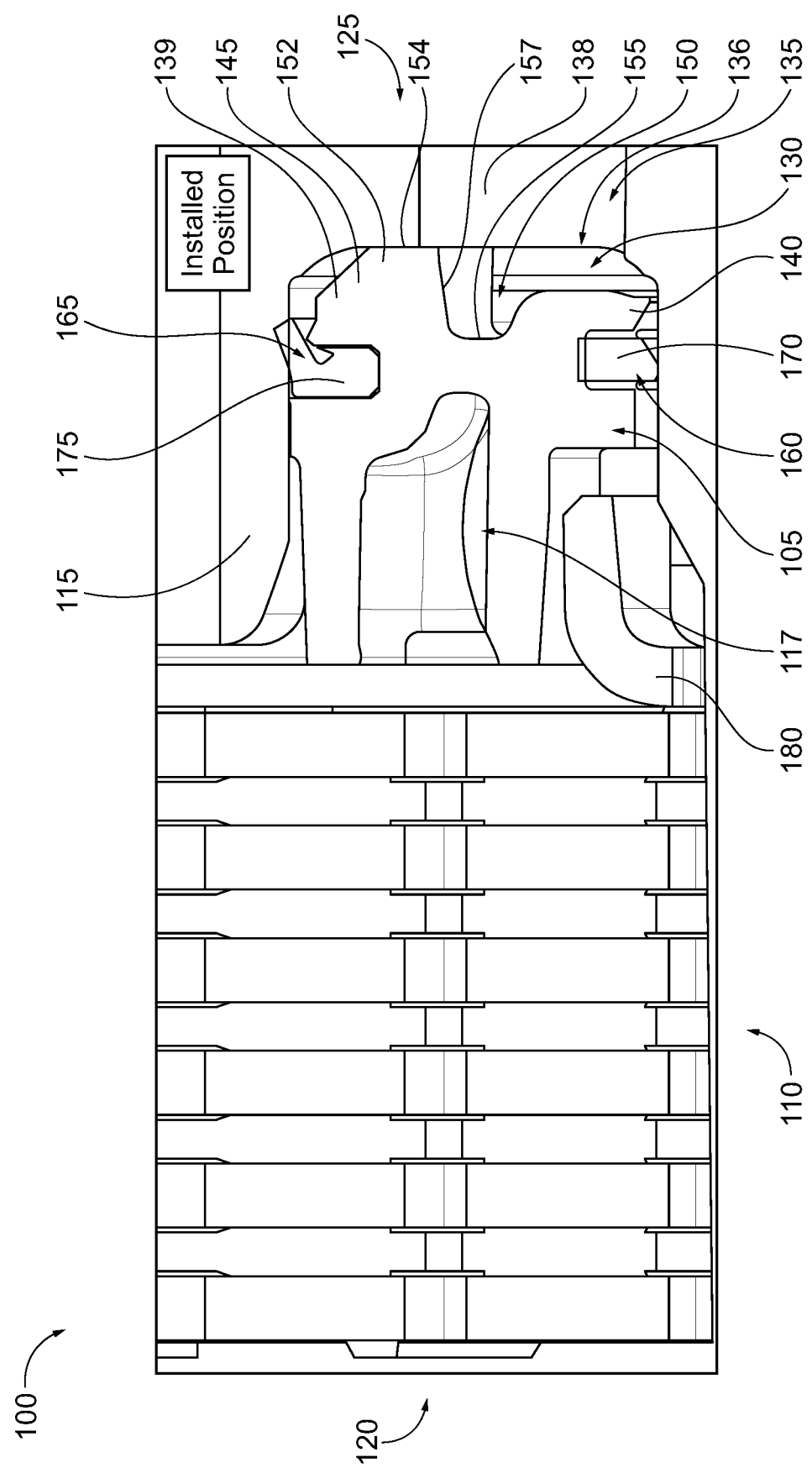
FIG. 1 is a cross-sectional view of a clutch assembly in a disengaged configuration.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

Referring to FIG. 1, a clutch assembly 100 is generally configured to selectively couple components of a drivetrain of a vehicle. For example, the clutch assembly 100 can couple the output of an engine and/or motor to a transmission, gearbox, and/or another device in a drivetrain. The clutch assembly 100 can be used in both gas powered and electric vehicles. In one form, the clutch assembly 100 is incorporated into an automatic transmission.

In the illustrated embodiment, the clutch assembly 100 includes a piston 105, a clutch pack 110, and a drum or housing 115. The housing 115 defines a bore 117 in which the piston 105 is slidably disposed. The piston 105 and bore 117 in the depicted example have an annular or ring shape, and the clutch pack 110 is generally annular in shape. In one embodiment, the piston 105 and/or clutch pack 110 are positioned radially around a hub and/or shaft of the transmission. The piston 105 is configured to selectively engage the clutch pack 110. For example, the clutch pack 110 can mechanically couple separate components of the vehicle drivetrain such that the components can be selectively coupled by the clutch assembly 100. The clutch assembly 100 utilizes a hydraulic fluid to move or stroke the piston 105 in order to actuate the clutch pack 110. In one example, the hydraulic fluid is oil, but other types of fluids can be used in other examples. The housing 115 contains the components of the clutch assembly 100 and the hydraulic fluid. In one example, the housing 115 is integrated with a housing for another part of the vehicle drivetrain, such as a housing for a transmission, motor, and/or engine. The piston 105 and housing 115 are generally made from rigid materials, such as steel, aluminum, and/or another metallic material. Further, the bore 117 of the housing 115 is generally formed to match at least a portion of the piston 105 such that the piston 105 and housing 115 fit together within a certain tolerance. Within the housing 115, the clutch pack 110 is positioned on a clutch side 120 relative to the piston 105. A hydraulic side 125 is defined relative to the piston 105 on an opposite side from the clutch side 120.

On the hydraulic side 125 of the clutch assembly 100, the piston 105 and housing 115 define a hydraulic chamber 130 in the bore 117. The hydraulic chamber 130 is configured to contain the hydraulic fluid. Further, the housing 115 defines a hydraulic fluid passage 135 that provides a path for the hydraulic fluid to enter and exit the hydraulic chamber 130. As can be seen, the passage 135 has an opening 136 at the bore 117, and a wall 138 surrounds the passage 135. For example, the hydraulic fluid can travel through the passage 135 and into the hydraulic chamber 130 through the opening 136 from a reservoir, a pump, and/or another device that contains the hydraulic fluid.

As should be appreciated, the housing 115 can be initially cast or otherwise shaped to form the bore 117 and/or the passage 135. Alternatively or additionally, the housing 115 can be modified to form the bore 117 and/or the passage 135, such as through machining, drilling, and/or other techniques. In FIG. 1, the piston 105 is illustrated in a disengaged or installed position. In the disengaged position, the piston 105 is positioned towards the hydraulic side 125 such that the piston 105 does not contact the clutch pack 110. When in the disengaged position, the hydraulic fluid is at a relatively low pressure inside the hydraulic chamber 130, or the hydraulic chamber 130 in some cases is partially or even completely empty of the hydraulic fluid. By depressurizing the hydraulic fluid in the hydraulic chamber 130, the pressure is reduced in the hydraulic chamber 130 and the piston 105 is biased towards the hydraulic side 125 via a return spring which will be discussed in greater detail below.

At the hydraulic side 125, the piston 105 includes a head 139. The head 139 includes an outer head 140, an inner head 145, and a channel 150 defined between the outer head 140 and the inner head 145. In the illustrated embodiment, the piston 105 is integrally formed such that the outer head 140 and inner head 145 are portions of the same piece of material. In one form, the channel 150 is formed in the head 139 via casting and/or machining, but the channel 150 can be formed in other ways. The outer head 140 is positioned radially outward from the inner head 145. At the hydraulic side 125, the head 139 has a standoff in the form of a pad 152 extending from the inner head 145, The inner head 145 is configured to contact a bore head wall 154 located at the hydraulic side 125 of the bore 117 when the piston 105 is in the disengaged position. As can be seen, the pad 152 on the inner head 145 extends higher than the surface of the outer head 140 at the hydraulic side 125. The outer head 140 and inner head 145 can be shaped in this way to facilitate the flow of hydraulic fluid into and/or out of the hydraulic chamber 130 in a quick and consistent manner.

As shown in FIG. 1, the channel 150 is located on the hydraulic side 125 of the piston 105, and the channel 150 is recessed towards the clutch side 120. The channel 150 has a floor 155 with walls 157 positioned opposite sides of the channel 150. As can be seen, the walls 157 along the pad 152 at the inner head 145 is generally aligned with the wall 138 of the passage 135. With this align, obstruction of hydraulic fluid flow through the opening 136 of the passage 135 is reduced so as to reduce constrictions in the fluid flow.

As illustrated, the piston 105 defines an outer groove 160 and an inner groove 165. The outer groove 160 is located on the outer head 140 and opens towards a radially outward direction. Similarly, the inner groove 165 is located on the inner head 145 and opens towards a radially inward direction. The outer groove 160 is configured to hold an outer gasket 170, and the inner groove 165 is configured to hold an inner gasket 175. The outer gasket 170 and inner gasket 175 are configured to fill gaps between the piston 105 and housing 115. By filling the gaps, the outer gasket 170 and inner gasket 175 are configured to form a seal between the hydraulic chamber 130 and the clutch pack 110 to prevent flow of hydraulic fluid. The outer gasket 170 and inner gasket 175 can include one or more types of gasket members. As should be appreciated, the radial position of the components can be reversed. In one example, the piston 105 is inverted such that the inner head 145 of the FIG. 1 example is positioned radially outward from the outer head 140. In another example, the outer gasket 170 and inner gasket 175 of the FIG. 1 example are arranged such that the inner gasket 175 is positioned radially outward from the outer gasket 170.

The clutch assembly 100 is designed such that the outer gasket 170 and inner gasket 175 are recessed as far as possible into the bore 117 so as to minimize the volume of the hydraulic chamber 130 which in turn enhances performance. Lower volumes of hydraulic fluid are needed in order to stroke or actuate the piston 105. As can be seen, the surfaces of the outer gasket 170 and inner gasket 175 facing the hydraulic side 125 are generally aligned with the floor 155 of the channel 150 in a flush or planar manner. In other words, portions of the outer head 140 and inner head 145 curve out towards the hydraulic side 125 so that the outer groove 160 and inner groove 165 for the outer gasket 170 and inner gasket 175 are properly supported by sufficient material in the head 139 of the piston 105. The channel 150 in the head 139 helps to reduce the material used and the overall weight of the piston 105 which in turn can help to promote responsiveness of the clutch assembly 100.

The clutch assembly 100 further includes a return spring 180 that is positioned on the clutch side 120 relative to the piston 105. The return spring 180 is configured to bias the piston 105 to the disengaged or installed position shown in FIG. 1. As hydraulic fluid exits the hydraulic chamber 130, the return spring 180 provides a force in a direction towards the hydraulic side 125 such that the piston 105 moves away from the clutch pack 110. For example, the return spring 180 can apply force to the piston 105 such that the pad 152 contacts the bore head wall 154 on the hydraulic side 125.

Figure 2:
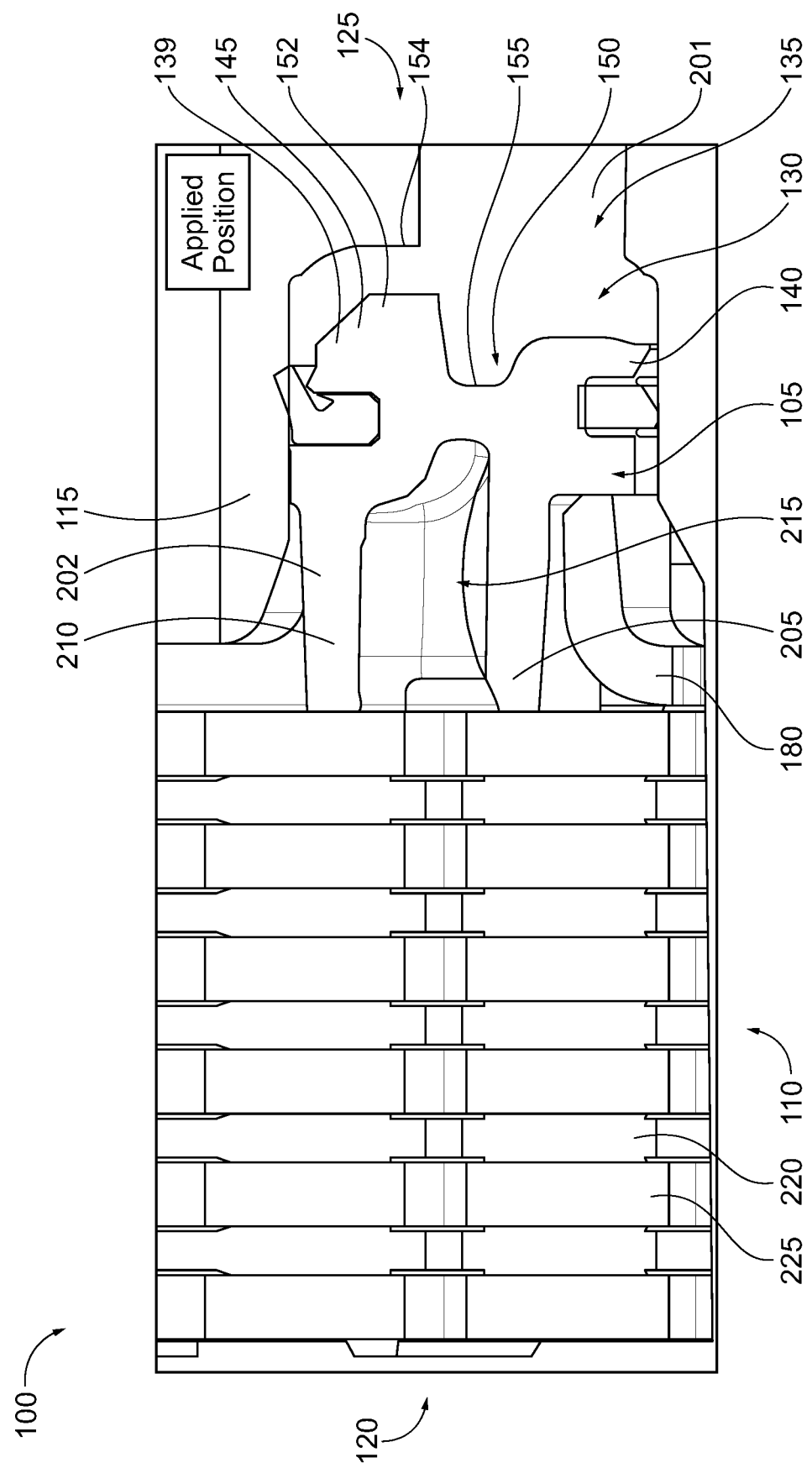
FIG. 2 is a cross-sectional view of a clutch assembly in an engaged configuration.

Referring to FIG. 2, the clutch assembly 100 is in an engaged configuration or position when the piston 105 compresses the clutch pack 110. In the engaged state, hydraulic fluid 201, such as oil, in the hydraulic chamber 130 applies force against the piston 105 and the return spring 180. The piston 105 in turn presses against the clutch pack 110. A pump and/or another device can force the hydraulic fluid 201 through the passage 135 to fill and pressurize the hydraulic chamber 130. As with disengaging the piston 105, the channel 150 may support reliable and quick operation of the piston 105 as the piston 105 engages. For example, the shape, position, surface, and/or other characteristics of the piston 105 allows the hydraulic fluid 201 to fill the hydraulic chamber 130 in a faster and/or more desirable way in as compared to earlier designs.

In the illustrated example, the piston 105 includes an engagement member 202 with an outer ridge 205 and an inner ridge 210. The outer ridge 205 is positioned on a radially outward portion of the engagement member 202 of the piston 105 and towards the clutch side 120. Similarly, the inner ridge 210 is positioned on a radially inward portion of the engagement member 202 and towards the clutch side 120. As illustrated, the piston 105 contacts the clutch pack 110 through the engagement member 202 (i.e., via the outer ridge 205 and inner ridge 210). The piston 105 further defines a cavity 215 between the outer ridge 205 and inner ridge 210. The cavity 215 opens towards the clutch side 120. In one embodiment, the cavity 215 reduces the weight of the piston 105 while not significantly reducing the strength and/or rigidity of the piston 105 compared to a solid piston 105.

As illustrated, the clutch pack 110 includes at least one friction plate 220 and at least one reaction plate 225. The friction plates 220 are configured to provide frictional force between the reaction plates 225. When the piston 105 contacts the clutch pack 110, the friction plates 220 and reaction plates 225 mechanically couple through frictional forces. As noted previously, the clutch pack 110 allows parts of a vehicle drivetrain to selectively couple by engaging and disengaging the piston 105 against the clutch pack 110.

Figure 3:
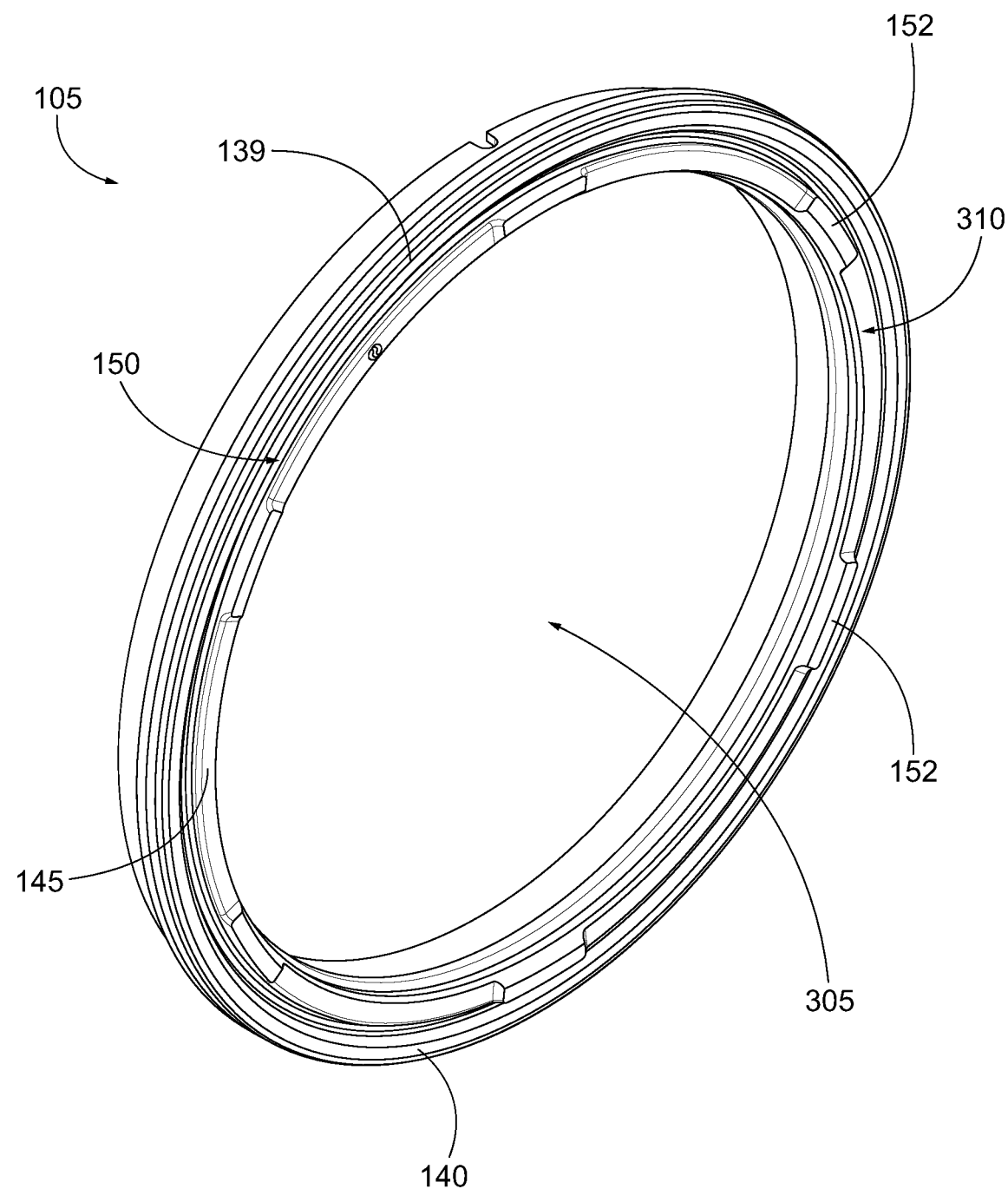
FIG. 3 is a perspective view of a piston found in the FIG. 1 clutch assembly.
Figure 4:
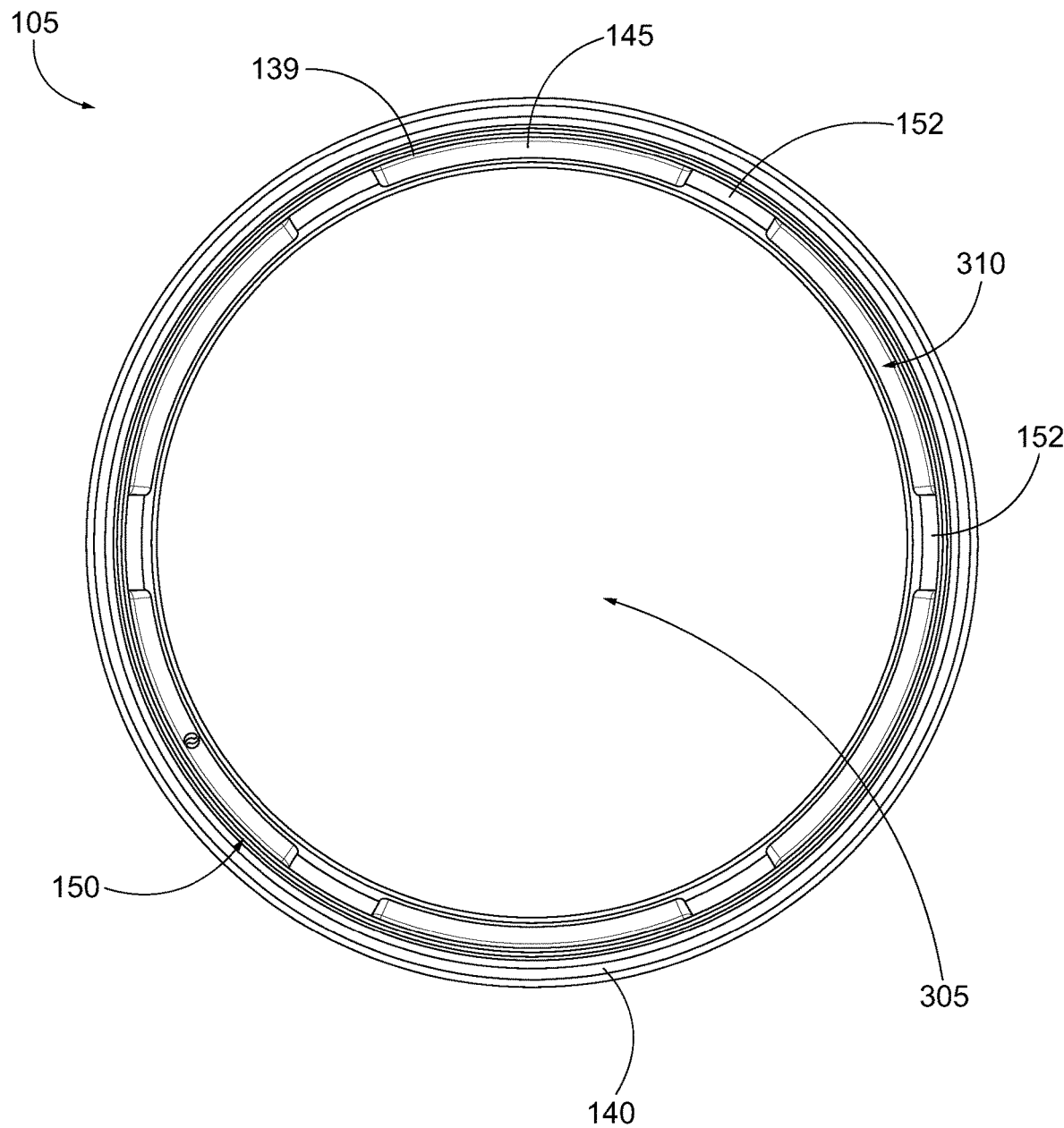
FIG. 4 is a side view of the FIG. 3 piston on a hydraulic side.
Figure 5:
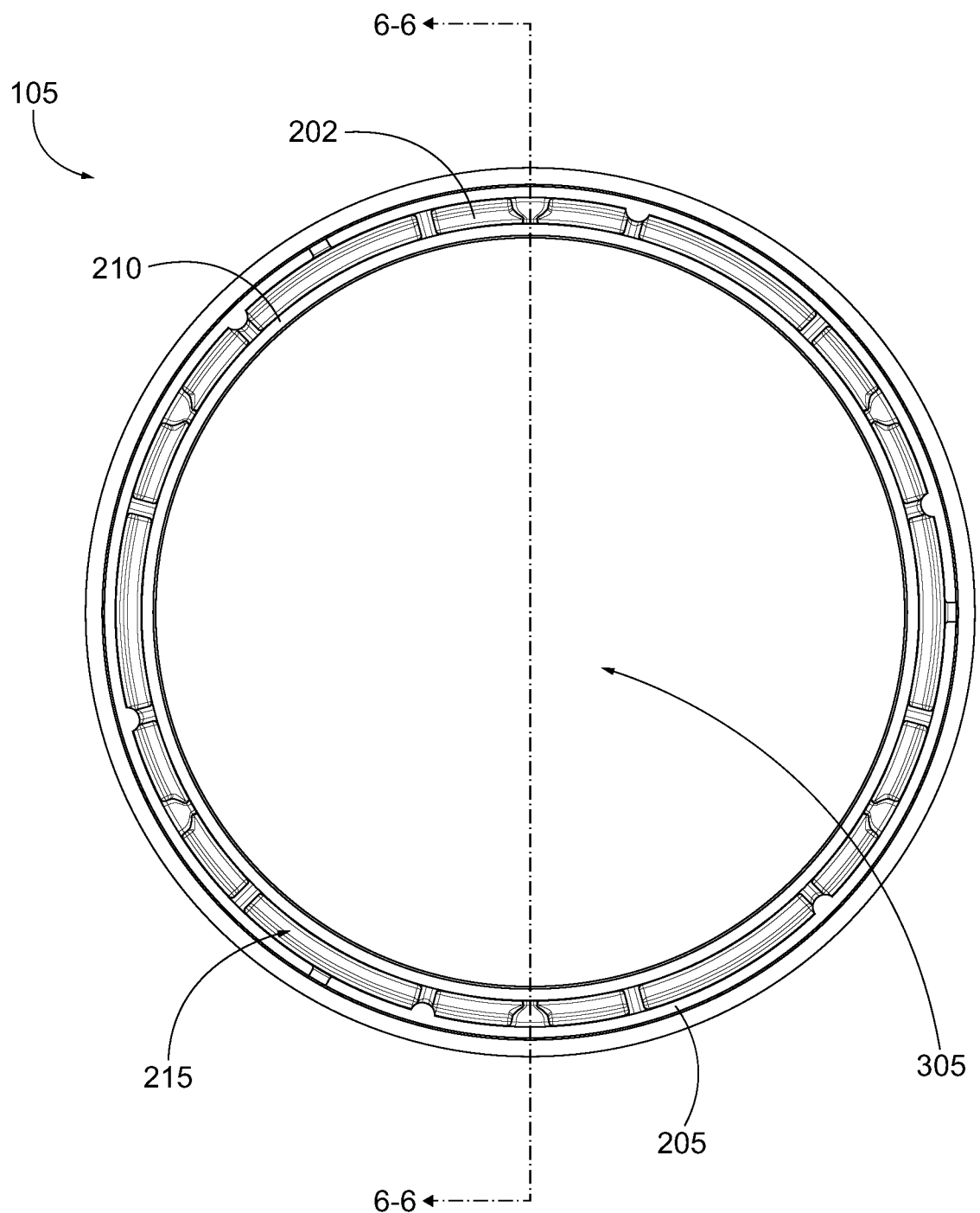
FIG. 5 is a side view of the FIG. 3 piston on a clutch side.

FIGS. 3, 4 and 5 show full views of the isolated piston 105. As illustrated, the piston 105 is annular and defines a drivetrain opening 305 on a radially inward portion. When the piston 105 is installed in the clutch assembly 100, one or more parts of a vehicle drivetrain, such as a hub, may be positioned within the drivetrain opening 305. Further, the piston 105 extends fully circumferentially around the drivetrain opening 305. In one form, the piston 105 is made from a rigid material such that the piston 105 maintains shape under pressure from hydraulic fluid. For example, the piston 105 can be made of steel, aluminum, and/or other metals. In one embodiment, the piston 105 is cast from a mold and/or machining is used to form the features of the piston 105. In another embodiment, the piston 105 is 3D printed to form the desired shape of the channel 150.

The channel 150 extends fully along the circumference of the piston 105. The shape of the channel 150 is maintained around the circumference. Similarly, the shape of the outer head 140 is maintained around the circumference of the piston 105. In other variations, the channel 150 is discontinuous so as to form discrete arcs along the head 139.

In some cases, the inner head 145 is not necessarily consistent around the circumference. In the illustrated example, the inner head 145 includes multiple pads 152 positioned at multiple points around the circumference. The pad 152 can be integrally formed with the inner head 145 and the whole piston 105. The shape of the inner head 145 varies around the circumference of the piston 105 due to the pads 152. Additionally, the cavity 215 is not necessarily consistent around the circumference. As illustrated, the shape of the cavity 215 varies around the circumference of the piston 105. For example, the cavity 215 includes support features that are helpful with casting and/or forming the piston 105 in another way. As should be appreciated, the pads 152 could be positioned at different points on the piston 105, additional intermittent features could be included around the circumference of the piston 105, and/or the shape of the piston 105 can vary around the circumference in a variety of other ways.

In the illustrated example, the pads 152 are equidistantly spaced around the circumference of the piston 105. The pads 152 define one or more flow gaps 310. The gaps 310 facilitate the entire face of the head 139 of the piston 105 to be in contact with the hydraulic fluid 201. The larger exposed surface area provided by the gaps 310 helps to enhance responsiveness of the piston 105.

Figure 6:
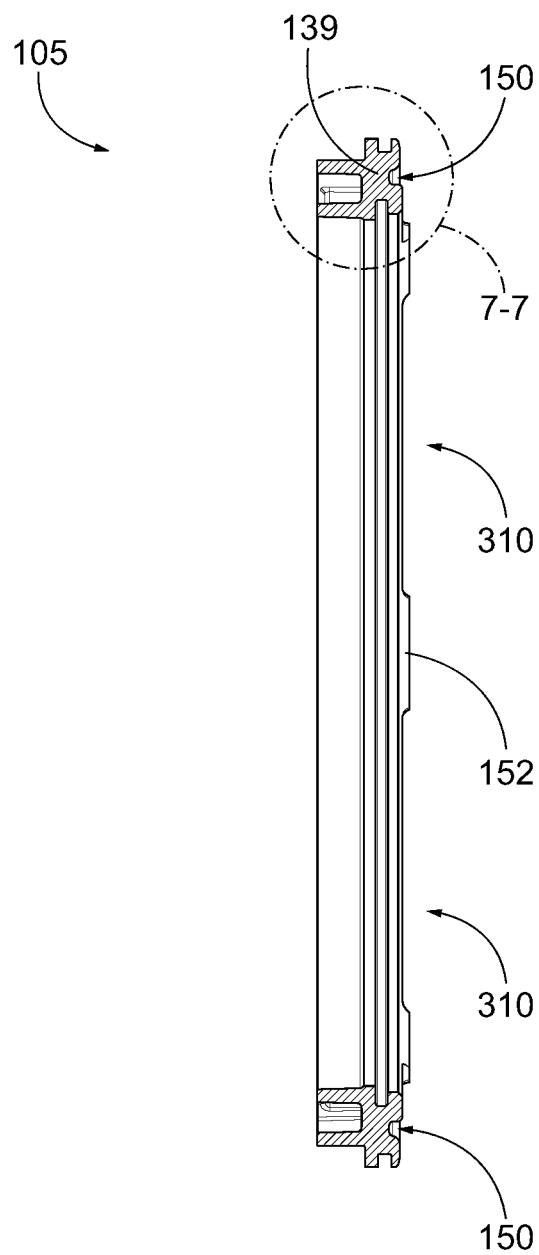
FIG. 6 is a cross-sectional view of the FIG. 3 piston taken along line 6-6 in FIG. 5.
Figure 7:
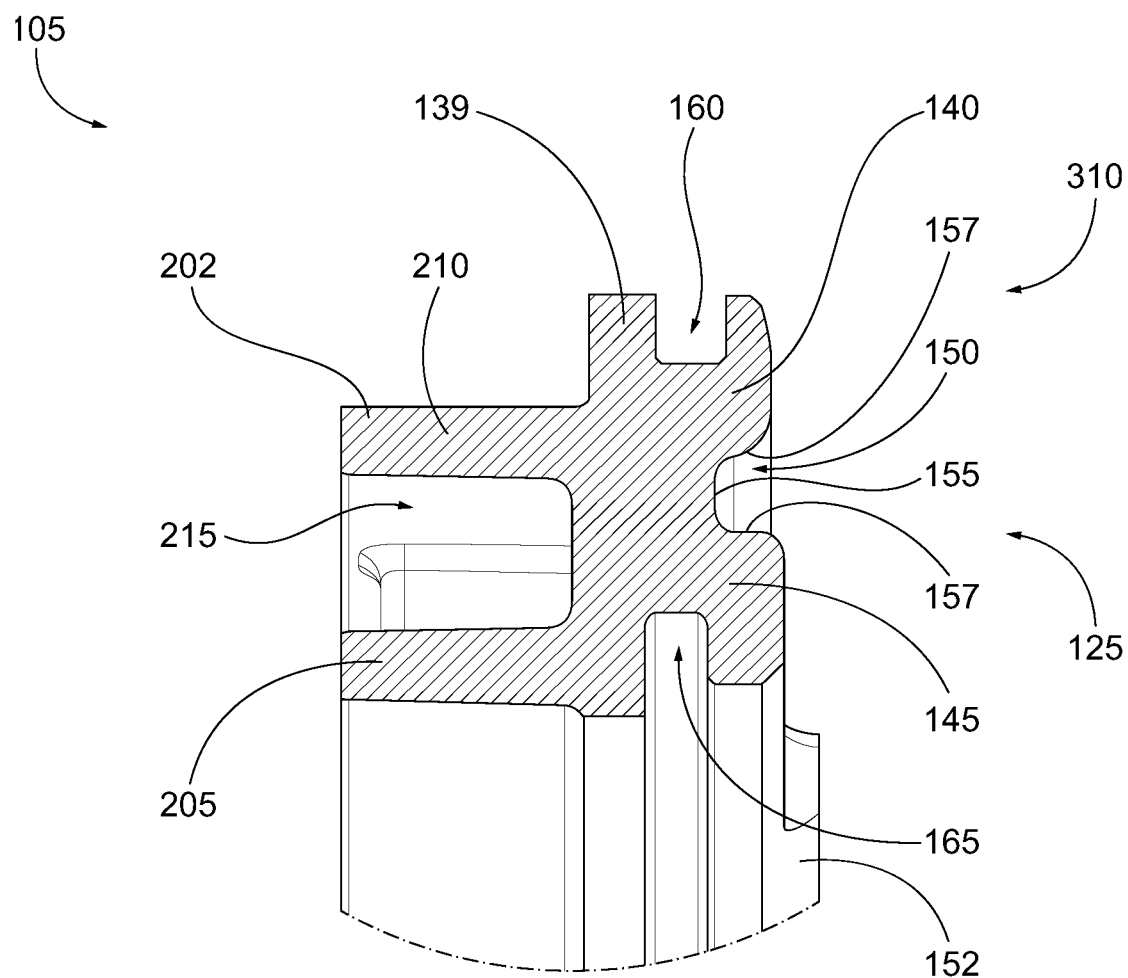
FIG. 7 is an enlarged view of the FIG. 3 piston taken from section 7-7 in FIG. 6.

Referring to FIGS. 6 and 7, the cross-sectional views of the piston 105 depict similar features of the piston 105 as shown in FIGS. 1 and 2. However, the cross-section in FIGS. 6 and 7 shows a different cross-section of the inner head 145 than in FIGS. 1 and 2. The section of the inner head 145 in FIGS. 6 and 7 does not include the pad 152. In other words, the section is taken at the gap 310 which is located between the pads 152. As shown, the walls 157 of the channel 150 transition smoothly to the floor 155 in a curved manner.

Referring to FIGS. 1, 2, 3, 6, and 7, the pads 152 in conjunction with the flow gaps 310 on the piston 105 provides a large area for the hydraulic fluid 201 to flow against the head 139 of the piston 105. The design of the clutch assembly 100 facilitates less flow constrictions of the hydraulic fluid 201 when the piston 105 moves between the engaged and disengaged positions. The hydraulic fluid 201 can flow more quickly and more consistently in and out of the hydraulic chamber 130 in comparison to prior designs. Using the illustrated design, the performance of the piston 105 is highly reliable and consistent during transitions between engaged and disengaged states.

During actuation of the piston 105, the clutch assembly 100 fills or pressurizes the hydraulic chamber 130 with the hydraulic fluid 201. As noted previously, the hydraulic fluid 201 flows from a pump and/or reservoir and through the passage 135. While hydraulic fluid 201 fills the hydraulic chamber 130, the hydraulic fluid 201 applies force to the piston 105 to compress the return spring 180. The piston 105 moves toward the clutch side 120 to compress the clutch pack 110. The piston 105 and clutch pack 110 are then in the engaged state or position.

When disengaging the piston 105 from the clutch pack 110, the clutch assembly 100 exhausts the hydraulic fluid 201 from the hydraulic chamber 130 through the passage 135. The return spring 180 pushes the piston 105 towards the hydraulic side 125 of the bore 117. As the hydraulic fluid 201 exits the hydraulic chamber 130, the flow of the hydraulic fluid 201 through the opening 136 of the passage 135 is generally unobstructed. With the depicted construction of the clutch assembly 100, the hydraulic fluid 201 is able to flow quickly and/or uniformly into the passage 135.

The piston 105 is configured to repeatedly perform at the same quality level. Specifically, the piston 105 and hydraulics are configured to perform nearly the same during multiple stroking movements of the piston 105. In one example, the piston 105 can repeatedly exhaust most or even all the hydraulic fluid 201 from the hydraulic chamber 130 within a certain amount of time. For instance, at least 90 percent of the hydraulic fluid can exit the hydraulic chamber 130 in under one second. In another example, the piston 105 can repeatedly exhaust hydraulic fluid at a constant or nearly constant rate until a certain amount of hydraulic fluid has exited the hydraulic chamber 130. For instance, 90 percent of the hydraulic fluid can exit the hydraulic chamber 130 at a constant rate. In another instance, the rate fluctuates by less than 10 percent until at least 90 percent of the hydraulic fluid exits the hydraulic chamber 130.

The piston 105 is further configured to operate consistently in different environmental conditions. In one example, the piston 105 can operate consistently across varying operating temperatures, such as at 20, 40, and 80 degrees Celsius. For instance, the piston 105 can exhaust all or nearly all of the hydraulic fluid from the hydraulic chamber 130 within the same amount of time across multiple temperatures and/or the piston 105 can exhaust the hydraulic fluid at a constant or nearly constant rate across multiple temperatures. The performance of the piston 105 is repeatable such that the quality of clutch engagement and disengagement is consistent across multiple instances.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"And/Or" generally refers to a grammatical conjunction indicating that one or more of the cases it connects may occur. For instance, it can indicate that either or both of the two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Bore" generally refers to a long hollow passage of some mechanical part or other object. Typically, but not always, the bore has a cylindrical shape. In one form, the bore is usually a cylindrical hole made by the turning or twisting movement of a tool, such as a drill, but the bore can be formed in other ways.

"Cavity" generally refers to an empty space in a solid object. The cavity can be completely or partially surrounded by the solid object. For example, the cavity can be open to the surrounding environment.

"Channel" generally refers to a long, narrow groove in a surface of an object.

"Circumferentially Uninterrupted Ring" means here a part or surface that may be of any shape with an enclosing boundary that is continuous. It may be circular or non-circular, including circuitous around various openings, elements or obstructions.

"Clutch" generally refers to a device that engages and disengages mechanical power transmission between two or more rotating shafts or other moving components. While the motions involved are usually rotary motions, linear clutches are also used to engage and disengage components moving with a linear or near linear motion. The clutch components can for instance be engaged and disengaged through mechanical, hydraulic, and/or electrical actuation. The clutches can include positive type clutches and friction type clutches. Wet type clutches are typically immersed in a cooling lubrication liquid or other fluid, and dry clutches are not bathed in such liquids. Some non-limiting examples of clutches include cone clutches, centrifugal clutches, torque limiter clutches, axial clutches, disc clutches, dog clutches, and rim clutches, to name just a few.

"Flow" generally refers to the motion of a fluid. In some cases, flow of a fluid is contained within a channel or other space defined by one or more solid objects. For example, flow of a fluid can be contained within a pipe, a vent, a hose, a vessel, a space defined between multiple objects, and/or another space. Typically, flow of a fluid is contained such that the fluid is guided in a desired direction along a desired pathway. The direction of the flow at a point is the collective direction that various sections of a fluid move toward at that point. For example, the direction of flow may be the average of the directions that different sections of a body of fluid move toward. In one example, a fluid can flow in a smooth, laminar fashion such that all or nearly all of the body of fluid flows in the same general direction. In another example, a fluid can flow in a turbulent fashion where one or more sections of the body of fluid recirculate, swirl, move randomly, and/or move in another way against the general direction of flow.

"Fluid" generally refers to a substance that does not have a fixed shape. For example, a fluid includes a liquid and/or a gas. Typically, fluids are able to flow easily, such as air flowing over a wing, blood flowing through a circulatory system, water flowing through plumbing, or oil flowing through a motor as examples. In some cases, a fluid refers to a mixture of solids, liquids, and/or gases. For example, a slurry of solids and water, liquid droplets mixed with air, aerated solid particles, a mixture of solids with liquids and gases, and/or other mixtures of different materials may be fluids.

"Gasket Member" means here an object designed to seal the junction between two surfaces. A gasket member may be a variety of shapes, for example, but not limited to, circular, square or hexagonal. A gasket member may be made of any material that is effective for sealing a junction between two materials, such as rubber, plastic, or other kinds of polymers. It may be unitary or non-unitary. It may be made of one material or more than one material.

"Housing" generally refers to a component that covers, protects, or supports another thing. For example, the casing of a desktop computer is its housing component and can be made of multiple materials to protect the internal component.

"Hydraulic fluid" generally refers to a fluid that is used to transfer power in various devices. Hydraulic fluid is used in devices such as brakes, power steering, transmissions, and industrial machinery to name a few examples. Typically, but not always, hydraulic fluid is non-compressible. In other words, the volume of the fluid does not change when pressure on the fluid changes. Hydraulic fluid can be water-based and/or oil-based. For example, hydraulic fluid can be an oil, such as mineral oil. In some cases, hydraulic fluid fulfills secondary purposes, such as lubricating and/or cooling moving parts of a device.

"Integrally Formed" generally refers to a component and/or multiple components that are fused into a single piece. Integrally formed components are incapable of being dismantled without destroying the integrity of the component.

"Metallic" generally refers to a material that includes a metal, or is predominately (50% or more by weight) a metal. A metallic substance may be a single pure metal, an alloy of two or more metals, or any other suitable combination of metals. The term may be used to refer to materials that include nonmetallic substances. For example, a metallic cable may include one or more strands of wire that are predominately copper sheathed in a polymer or other non-conductive material.

"Opening" generally refers to a space or hole that something can pass through.

"Powertrain" generally refers to devices and/or systems used to transform stored energy into kinetic energy for propulsion purposes. The powertrain can include multiple power sources and can be used in non-wheel-based vehicles. By way of non-limiting examples, the stored energy sources can include chemical, solar, nuclear, electrical, electro-chemical, kinetic, and/or other potential energy sources. For example, the powertrain in a motor vehicle includes the devices that generate power and deliver the power to the road surface, water, and/or air. These devices in the powertrain include engines, electric motors, transmissions, drive shafts, differentials, and/or final drive components (e.g., drive wheels, continuous tracks, propeller, thrusters, etc.).

"Radially Outward" generally refers to a relative position that is positioned at a greater distance from a defined center point or axis. An object may be extending radially outward if the object has a starting point at a given distance from the defined center or axis and then moves farther away from that center point or axis.

"Spring" generally refers to an elastic object that stores mechanical energy. The spring can include a resilient device that can be pressed, pulled, and/or twisted but returns to its former shape when released. The spring can be made from resilient or elastic material such as metal and/or plastic. The spring can counter or resist loads in many forms and apply force at constant or variable levels. For example, the spring can include a tension spring, compression spring, torsion spring, constant spring, and/or variable spring. The spring can take many forms such as by being a flat spring, a machined spring, and/or a serpentine spring. By way of nonlimiting examples, the springs can include various coil springs, pocket springs, Bonnell coils, offset coils, continuous coils, cantilever springs, volute springs, hairsprings, leaf springs, V-springs, gas springs, leaf springs, torsion springs, rubber bands, spring washers, and/or wave springs, to name just a few.

"Transmission" generally refers to a power system that provides controlled application of mechanical power. The transmission uses gears and/or gear trains to provide speed, direction, and/or torque conversions from a rotating power source to another device.

"Turbulence" generally refers to a chaotic, unsteady, and/or non-uniform quality of the motion of a fluid. For example, a flow may be turbulent when sections of a fluid recirculate, swirl, move randomly, and/or move in another way against a general direction of flow. The turbulence of a flow increases when more sections of the fluid move chaotically and/or when a velocity of the chaotic sections of the fluid increases. Turbulence is caused by changes in pressure and/or physical disruptions in the flow of a fluid. For example, the shape of an object in the path of flow of a fluid can disrupt the flow and cause the flow to be turbulent.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Reference Numbers | |
|---|---|
| 100 | clutch assembly |
| 105 | piston |
| 110 | clutch pack |
| 115 | housing |
| 117 | bore |
| 120 | clutch side |
| 125 | hydraulic side |
| 130 | hydraulic chamber |
| 135 | passage |
| 136 | opening |
| 138 | wall |
| 139 | head |
| 140 | outer head |
| 145 | inner head |
| 150 | channel |
| 152 | pad |
| 154 | bore head wall |
| 155 | floor |
| 157 | walls |
| 160 | outer groove |
| 165 | inner groove |
| 170 | outer gasket |
| 175 | inner gasket |
| 180 | return spring |
| 201 | hydraulic fluid |
| 202 | engagement member |
| 205 | outer ridge |
| 210 | inner ridge |
| 215 | cavity |
| 220 | friction plate |
| 225 | reaction plate |
| 305 | drivetrain opening |
| 310 | gap |

What is claimed is:

1. A system, comprising:
a clutch assembly including
a clutch pack,
a housing defining a bore,
a piston being slidably disposed in the bore,
wherein the piston is configured to actuate the clutch pack,
wherein the piston has a head,
wherein the head has one or more pads extending from the head,
wherein the housing defines a flow passage into the bore,
wherein the flow passage is configured to both supply hydraulic fluid to the bore and exhaust the hydraulic fluid from the bore,
wherein the head includes an inner head and an outer head,
wherein the head defines a channel,
wherein the channel is defined between the inner head and the outer head,
wherein the inner head is disposed radially inwards relative to the outer head,
wherein the piston has an engaged position where the piston engages the clutch pack,
wherein the piston has a disengaged position where the piston is disengaged from the clutch pack,
wherein the bore has a bore head wall,
wherein the bore head wall faces the head of the piston,
wherein the one or more pads extend from the inner head to form a standoff,
wherein the one or more pads are absent from the outer head,
wherein the one or more pads define one or more gaps where the hydraulic fluid flows,
wherein the one or more pads are configured to contact the bore head wall when in the disengaged position,
wherein the inner head and the outer head each have a surface facing the bore head wall that are planar with one another,
wherein the one or more pads extend from the surface of the inner head farther than the surface of the outer head towards the bore head wall,
wherein the inner head defines an inner groove,
an inner gasket received in the inner groove,
wherein the inner gasket is configured to seal against the bore,
wherein the outer head defines an outer groove,
an outer gasket received in the outer groove,
wherein the outer gasket is configured to seal against the bore, and
wherein the inner gasket and the outer gasket axially overlap in a direction that is orthogonal to a rotational axis of the clutch assembly.

2. The system of claim 1, wherein the head of the piston is configured to reduce flow restrictions of the hydraulic fluid from the flow passage.

3. The system of claim 2, wherein:
the flow passage has an opening into the bore;
the flow passage has a passage wall; and
the one or more pads are aligned with the passage wall of the flow passage to reduce the flow restrictions of the hydraulic fluid.

4. The system of claim 1, further comprising:
a spring being configured to bias the piston to the disengaged position.

5. The system of claim 1, wherein:
the clutch assembly has a clutch side and a hydraulic side located opposite to the clutch side;
the head defines the inner groove configured to seal against the bore; and
the head is configured to recess the inner gasket towards the hydraulic side.

6. The system of claim 1, wherein:
the piston has an engagement member extending opposite to the head; and
the engagement member is configured to engage the clutch pack.

7. The system of claim 6, wherein:
the engagement member has an inner ridge and an outer ridge;
the inner ridge is located radially inwards relative to the outer ridge; and the engagement member defines a cavity between the inner ridge and the outer ridge.

8. The system of claim 1, wherein:

the channel has a floor and walls extending from opposite sides of the floor;

the bore head wall defines an opening of the flow passage into the bore;

the flow passage has a passage wall at the opening in the bore head wall; and one of the walls of the channel along one of the one or more pads at the inner head is aligned with the passage wall of the flow passage.

9. A system, comprising:

a clutch assembly including
  a housing defining a bore,
  a clutch pack,
  a piston being configured to actuate the clutch pack, wherein the piston has a head,
  wherein the head includes an inner head and an outer head, wherein the piston has an engaged position where the piston engages the clutch pack, wherein the piston has a disengaged position where the piston is disengaged from the clutch pack,
  a spring being configured to bias the piston to the disengaged position,
  wherein the inner head defines an inner groove,
  an inner gasket received in the inner groove,
  wherein the inner gasket is configured to seal against the bore,
  wherein the outer head defines an outer groove,
  an outer gasket received in the outer groove,
  wherein the outer gasket is configured to seal against the bore,
  wherein the head of the piston is configured to recess the inner gasket and the outer gasket further into the bore;
  wherein the inner gasket and the outer gasket axially overlap in a direction that is orthogonal to a rotational axis of the clutch assembly,
  wherein the head has one or more pads extending from the head,
  wherein the head defines a channel,
  wherein the channel is defined between the inner head and the outer head,
  wherein the inner head is disposed radially inwards relative to the outer head,
  wherein the one or more pads extend from the inner head to form a standoff,
  wherein the one or more pads are absent from the outer head,
  wherein the one or more pads define one or more gaps,
  wherein the inner head and the outer head each have a surface that are planar with one another, and
  wherein the one or more pads extend from the surface of the inner head farther than the surface of the outer head.

10. The system of claim 9, wherein:

the channel has a floor; and the inner gasket and the outer gasket have surfaces aligned with the floor of the channel in a planar manner.

11. The system of claim 9, wherein:

the housing defines a flow passage into the bore;

the flow passage is configured to transport hydraulic fluid; and the head of the piston is configured to reduce flow restrictions of the hydraulic fluid from the flow passage.

12. The system of claim 11, wherein:

the flow passage has an opening into the bore;

the flow passage has a passage wall; and the one or more pads are aligned with the passage wall of the flow passage to reduce the flow restrictions of the hydraulic fluid.

13. The system of claim 9, wherein:

the clutch assembly has a clutch side and a hydraulic side located opposite to the clutch side;

the clutch pack is positioned on the clutch side;

the channel has a floor and walls extending from opposite sides of the floor;

the outer gasket and the inner gasket have surfaces that face the hydraulic side; and the surfaces of the outer gasket and the inner gasket are aligned with the floor of the channel in a planar manner.

14. The system of claim 13, wherein the inner head and the outer head each curve out from the floor of the channel towards the hydraulic side to provide material for supporting the inner groove for the inner gasket and the outer groove for the outer gasket.

* * * * *